FIG. 1

INVENTOR.
MYRON L. ANTHONY
BY
Wallace, Kinzer & Gorn
Attys.

INVENTOR.
MYRON L. ANTHONY
BY
Wallace, Kinger & Dorn
ATTYS.

Dec. 8, 1970   M. L. ANTHONY   3,545,090
AIRCRAFT ATTITUDE INDICATOR DEVICES
Original Filed April 1, 1964   4 Sheets-Sheet 4

INVENTOR.
MYRON L. ANTHONY
BY
Wallace, Kinzer & Horn

United States Patent Office 3,545,090
Patented Dec. 8, 1970

3,545,090
AIRCRAFT ATTITUDE INDICATOR DEVICES
Myron L. Anthony, La Grange, Ill., assignor of ten percent to Thomas E. Dorn, Clarendon Hills, Ill.
Original application Apr. 1, 1964, Ser. No. 356,462, now Patent No. 3,344,665, dated Oct. 3, 1967. Divided and this application Sept. 11, 1967, Ser. No. 666,905
Int. Cl. G01c 21/00
U.S. Cl. 33—204                                    9 Claims

ABSTRACT OF THE DISCLOSURE

A control system for actuating a unified display indicator that presents both roll and pitch attitude of an aircraft from the viewpoint of a pilot flying by visual observation with the aircraft taken as a fixed reference representative of the environment, including specific roll and pitch indicator devices. The roll attitude indicator comprises a simple pendulum limited to pivotal movement about an axis parallel to the longitudinal axis of the aircraft and a semi-rigid gyro having a rotational axis parallel to the transverse axis of the aircraft and limited to pivotal movement about an axis parallel to the longitudinal axis of the aircraft. The precession torque of the gyro is proportional to the angular velocity of the aircraft about its vertical axis. An indicator is coupled to both the pendulum and the gyro for movement to display the instantaneous roll attitude of the aircraft as the vector sum of the precession torque of the gyro and the free pivotal movement of the pendulum. The pitch attitude indicator again comprises a simple pendulum, this pendulum being limited to pivotal movement about an axis parallel to the transverse axis of the aircraft. The output of a speed sensing device is differentiated to develop a signal representative of acceleration of the aircraft along its longitudinal axis and this signal drives an electrical motor that applies a correction torque to the pendulum proportional to the aircraft acceleration. The same indicator that is used for roll attitude indication is also actuated by the pitch attitude pendulum so that its movement displays the pitch attitude of the aircraft to the pilot.

CROSS REFERENCES TO RELATED APPLICATIONS

This application is a division of application Ser. No. 356,462, filed Apr. 1, 1964, now Pat. No. 3,344,655.

BACKGROUND OF THE INVENTION

This application is a division of application Ser. No. tion system for aircraft; more particularly, the invention pertains to sensing apparatus utilized to actuate and control a display that presents aircraft performance and position to the pilot for instrument flying purposes.

The provision of adequate and usable equipment for instrument flying of aircraft has come to present a multitude of difficult and potentially dangerous problems. In view of the increasing numbers of private aircraft, it has become virtually essential to afford a relatively inexpensive instrumentation system that will enable a pilot having limited training, who flys on relatively infrequent occasions, to master at least the fundamentals of flying by instruments. This is virtually impossible with conventional aircraft instruments, which have been characterized by one administrator of the Federal Aviation Agency as a "steamfitters nightmare" added to the cockpit of the aircraft in bits and pieces without sensible planning.

Using conventional instruments, some sixty hours or more of training and an additional forty hours or more of flight instruction are required to enable most pilots to obtain even a limited mastery of instrument flying. This initial instruction must be followed by continuing practice on the part of the pilot. Even with this training, instrument flying with known control and display equipment is quite difficult; pilots with many hours of experience frequently find instrument flying to be an exhausting and frustrating experience. Nevertheless, because weather conditions can change rapidly under many circumstances, instrument flight capability of a rudimentary nature has been made a requisite for obtaining even a private flying license.

In comparing flying by visual reference and instrument flying, it is apparent that the aircraft controls and the pilot remain the same. Consequently, the existing disparity between the relative ease of piloting by visual reference and the difficulty of piloting by instrument must lie in the instruments themselves and in the manner in which they present flight information to the pilot. Generally speaking, conventional instruments present flight data to the pilot in a relatively unnatural manner. The psychological effects produced by many conventional instruments are to a substantial extent analogous to working with a mechanism while viewing the mechanism in a mirror. One example is presented by the differences between flying toward an object through visual reference and flying toward the same object by reference to a compass heading.

Virtually anyone can point an aircraft toward a visible object; by the same token, virtually anyone could equally well direct the aircraft along a given compass heading if the compass presentation were physically similar to the visual presentation. A conventional aircraft compass, however, affords what amounts to an inside-out presentation. Consequently, when the aircraft deviates from the selected heading, even experienced pilots must consciously remember which way to turn the aircraft in order to restore it to the proper heading. The correction of the aircraft heading is not a natural and instaneous reaction to the error information in the form presented by a conventional compass. Moreover, similar difficulties and disadvantages are presented by other conventional flying instruments, such as the gyroscopic attitude indicator, sometimes referred to as an "artificial horizon."

SUMMARY OF THE INVENTION

It is a principal object of the present invention, therefore, to present to the pilot of an aircraft an instantly understandable display of the flight performance of the aircraft, in a manner which is essentially analogous to the availability of the corresponding information when the pilot is flying on the basis of visual observation.

Because an aircraft moves three-dimensionally, and is subject to both angular and linear acceleration forces in a variety of directions, deviation of accurate information with respect to the instantaneous attitude of the aircraft is relatively difficult. Thus, an instrument that affords an accurate indication of rotation of the aircraft about its longitudinal axis, normally referred to as the "roll" attitude of the aircraft, while quite accurate during linear movement of the aircraft parallel to its axis may be quite inaccurate when the aircraft is turning. Similarly, an instrument that detects rotation of the aircraft about its transverse axis, parallel to the wings, usually referred to as the "pitch" attitude of the aircraft, may give completely erroneous information during periods in which the aircraft is accelerated or decelerated.

A further object of the invention, therefore, is to afford improved accuracy in the determination of the instantaneous attitude of an aircraft, particularly with respect to the roll and pitch attitude of the aircraft.

A more specific object of the invention is to develop roll attitude information, with respect to an aircraft, from a simple gyro mechanism and a simple pendulum, one compensating the other. In one roll attitude sensing instrument constructed in accordance with the invention, this is accomplished by a mechanical combination of the precessional gyro mechanism and the pendulum; in another embodiment, the same effect is obtained by combining electrical signals developed separately from the gyro and the pendulum.

A further specific object of the invention is to develop information pertaining to the pitch attitude of an aircraft in flight, by means of a relatively simple pendulum system compensated for acceleration effects.

An attitude indicator apparatus for an aircraft instrumentation system, for either roll or pitch attitude indication, in accordance with the invention, comprises a pendulum limited to movement about a single axis. Means are provided for mounting the pendulum within an aircraft with the pendulum axis parallel to a selected one of the longitudinal and transverse axes of the aircraft so that pivotal movement of the pendulum is representative of the combined effect of (1) changes in the direction of gravitational force on the pendulum due to rotation of the aircraft about said selected aircraft axis and (2) a specific function of the velocity of the aircraft. Additional sensing means are used to develop a signal representative of the aforesaid specific function of the velocity of the aircraft essentially independently of changes in the direction of gravitational force. An indicator is coupled to the pendulum and to said additional sensing means, for indicating the instantaneous attitude of the aircraft in relation to rotation of the aircraft about the selected aircraft axis.

A further object of the invention is to provide a new and improved comprehensive aircraft instrumentation system that is relatively inexpensive, as compared with comparably comprehensive systems constructed with conventional apparatus, yet which facilitates rapid learning of instrument flying at minimum expense.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

GENERAL CONTROL SYSTEM

Figure 1:
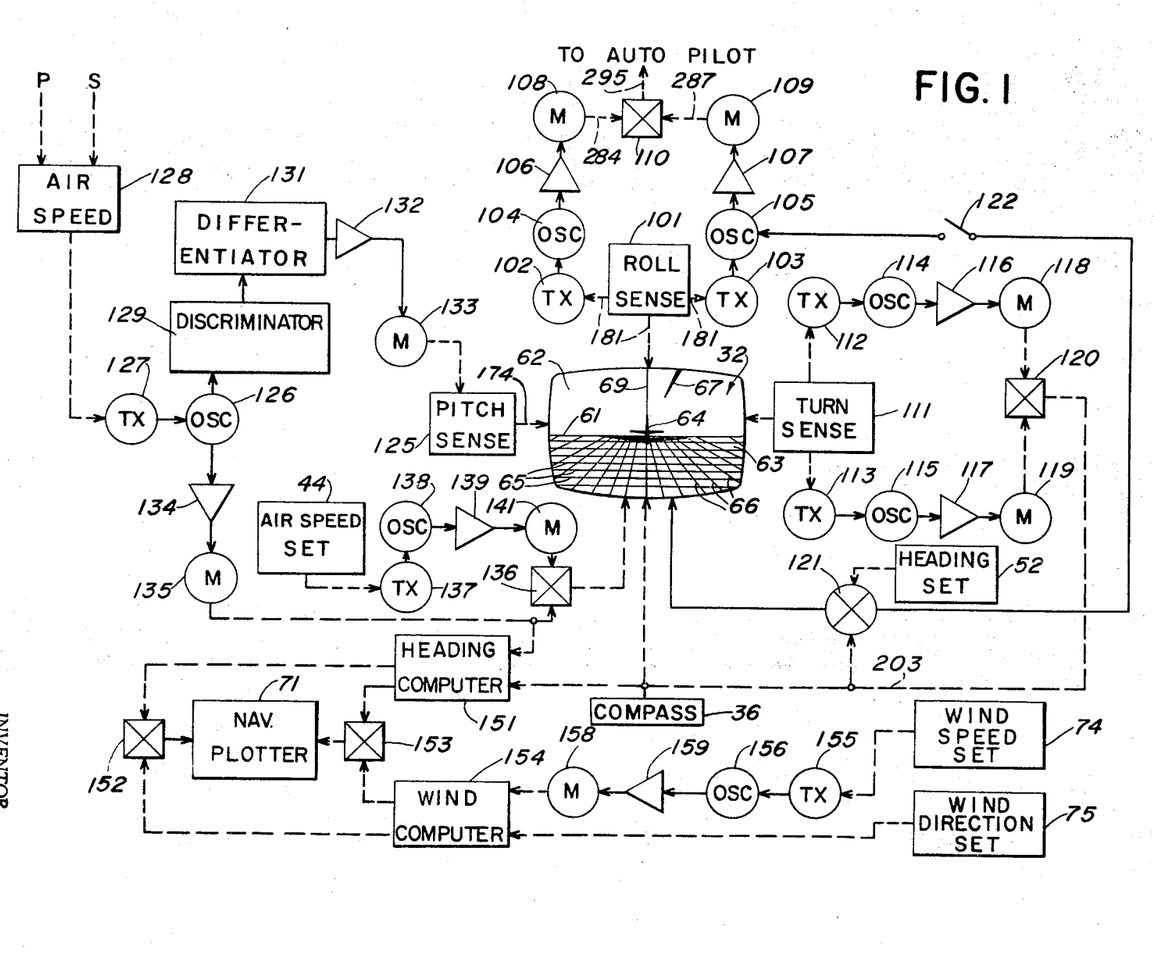
FIG. 1 is a schematic block diagram of a control system using attitude indicator apparatus constructed in accordance with the present invention.

FIG. 1 is a partially schematic block diagram of a control system employing attitude indicator apparatus constructed in accordance with the present invention and utilized to control a main attitude display 32 and a position plotting device 71. As shown therein, the control system comprises a roll sensing device 101. Device 101, preferred forms of which are described in detail hereinafter, senses rotational movement of the aircraft about its longitudinal axis. Device 101 is mechanically connected to the attitude indicator 64 of display 32 and rotates indicator 64 in a clockwise or counterclockwise direction to afford the pilot a direct indication of the roll attitude of the aircraft.

Roll sensing device 101 is also connected to a pair of transducers 102 and 103. Each of the transducers 102 and 103 is constructed to transform mechanical movement of the roll sensing device into an electrical signal that varies in some respect in response to changes in the roll attitude of the aircraft. Typically, each of these transducers may comprise a rotary differential transformer such as a Selsyn motor, or a rotary transducer of the kind described in Pat. No. 2,707,232 to Robert Adler.

Transducers 102 and 103 produce complementary outputs; thus, an increase in the output from transducer 102 is matched by a decrease in the output from transducer 103. Transducer 102 is coupled to an oscillator 104 and is utilized to control the frequency of that oscillator, in essentially the same manner as described in the aforementioned patent to Robert Adler. Similarly, the output signal from transducer 103 modulates and controls the operating frequency of a second oscillator 105.

The output signals from oscillators 104 and 105 are supplied to two individual limiting amplifiers 106 and 107, respectively. The output of amplifier 106 is utilized to drive a first synchronous stepping motor 108 and the output of amplifier 107 is supplied to and drives a second similar motor 109. Motors 108 and 109 may comprise conventional magnetic pulse stepping motors. These two motors are employed to drive an auto-pilot; accordingly, some substantial torque output is required from each motor. In a typical system, the available torque output of motors 108 and 109 drive a gear differential 110 that is mechanically connected to auto-pilot driving the ailerons of the aircraft.

The turn attitude control system is in many respects substantially similiar to that employed for roll attitude control. Thus, the system includes a turn rate sensing device 111. Device 111 may constitute the operating mechanism of a conventional gyro turn indicator. The yaw sensing device may be mechanically connected to indicator 64 of attitude display 32 to move the attitude indicator to the left or to the right of center line 69 to indicate rotational movement of the aircraft about its vertical axis. On the other hand, the turning movements of the aircraft are shown by the movements of a radial grid comprising directon scale 66 and are virtually always accompanied by roll attitude changes. Hence, the connection from device 111 to indicator 64 may be eliminated, if desired.

The turn indicator gyro mechanism comprising turn sensing device 111 is mechanically connected to a pair of variable turns ratio rotary transformers, the transducers 112 and 113. The mechanical connection is such that the signal outputs from transducers 112 and 113 are complementary in nature. That is, a turning movement of the aircraft in one direction increases the amplitude of the output signal from transducer 112 and correspondingly reduces the output signal from transducer 113; a turning movement in the opposite direction increases the output from transducer 113 and decreases the output from transducer 112.

Transducer 112 is electrically coupled, in a frequency control circuit, to an oscillator 114. Oscillator 114, in turn, is coupled through a limiting amplifier 116 to a synchronous pulse stepping motor 118. Similarly, the output signal from transducer 113 modulates the frequency of an oscillator 115, the output signal from oscillator 115 being supplied through an amplifier 117 to a similar small synchronous motor 119.

The two stepping motors 118 and 119 are employed to drive a small gear differential device 120. Differential 120 is mechanically connected to the rotational mechanism for the radial directiin scale 66. Device 120 also drives the annular heading scale of the direction indicator, compass 36.

Differential 120 is also utilized to drive an electrical comparator or differential device 121. Although device 121 could be a mechanical device, it preferably constitutes a rotary potentiometer bridge, as described more fully hereinafter, producing an electrical output signal that varies in sign and amplitude depending upon the rotational position of the bridge. Device 120 is also connected to a heading adjustment or setting device 52. Thus, device 121 compares a present heading in device 52 with the actual heading as determined by integration of turning movements of the aircraft by device 120. The output from device 121 is utilized to drive a differential command pointer 67 through a drive mechanism (not shown) that, in essence, constitutes a conventional electrical meter movement. The differential bridge 121 may also be electrically connected, through a switch 122, to an oscillator 105 in the auto-pilot control circuit to actuate the auto-pilot.

A third major input device for the control system shown in FIG. 1 is a pitch sensing device 125. Pitch sensing device 125 constitutes an acceleration-corrected pendulum mechanism, one embodiment of the sensing device being described in detail hereinafter. The pitch sensing device is mechanically connected to attitude indicator 64 of attitude display 32 and is utilized to move the aircraft indicator upwardly or downwardly to indicate to the pilot any changes in the pitch attitude of the aircraft.

Pitch sensing device 125 should be corrected in accordance with changes in acceleration of the aircraft. A principal component of the correction system is an oscillator 126. The operating frequency of oscillator 126 is varied in accordance with the output signal from a transducer 127, which again may be a rotary differential transformer. In this instance, the transducer is driven by conventional apparatus for determining the air speed of the aircraft. This apparatus may include a conventional air speed sensing device 128 having the usual static and pitot tube connections. Inasmuch as apparatus for determining the air speed of the aircraft, including the pitot-aneroid and static-aneroid sensing apparatus, is well known in the art, there is no necessity for a detailed description or discussion of this portion of the control system.

The output signal from oscillator 126 is supplied to a conventional discriminator 129 connected through a differentiator circuit 131 to an amplifier 132. Typically, discriminator 129 may be of the audio-frequency limited-pulse phase-multiplier type. A suitable discriminator that may be employed in the system is described and claimed in Pat. No. 3,024,419 of Myron L. Anthony, issued Mar. 26, 1962, although a variety of other discriminator circuits may be utilized as desired. The differentiated output of the discriminator is applied to drive a motor 133 in a direction indicative of acceleration or deceleration of the aircraft. Motor 133 is mechanically connected to pitch sensing device 125 to correct the pitch sensing device output for acceleration changes. The amplifier 132 in this circuit is preferably a limiting amplifier.

The output signal from oscillator 126 is also applied through an amplifier 134 to a motor 135. Motor 135, like motors 118 and 119, may comprise a simple and inexpensive magnetic pulse stepping motor having a relatively low output torque. Typically, a motor affording an output torque of approximately one inch ounce may be employed. Motor 135 is utilized as one driving input to a small gear differential 136.

An air speed adjustment or setting device 44 is utilized to actuate a rotary transducer 137. The output signal from transducer 137 is applied to an oscillator 138 to vary the frequency of the oscillator. The output signal from oscillator 138 is supplied through an amplifier 139 to a motor 141. Motor 141 constitutes a second input device for gear differential 136. The output shaft of differential 136 is mechanically connected to apparatus for moving a speed scale comprising the horizontal grid lines 65 of display device 32 either upwardly or downwardly within a ground field 63 to indicate to the pilot whether the aircraft is exceeding or has fallen below a preset air speed.

As noted above, the output of motor 133 is representative of acceleration or deceleration of the aircraft. In some instances, it may be preferable to drive grid 65 motor 133, presenting speed information in the main attitude display from the standpoint of acceleration rather than of a differential relative to the preset speed. Where this is done, an auxiliary display for the differential speed, represented by the output of device 136, is preferably provided.

The differential device 120 that drives bridge 121 and the yaw-movement mechanism for attitude indicator 64 also affords a first mechanical input to a heading computer 151. Computer 151 is also mechanically coupled to the output of motor 135. Computer 151 integrates and resolves the air speed information (afforded by the drive from motor 135) and the heading information (taken from differential 120) into appropriate coordinate movements of an indicator bug 73 of a plotter 71. Thus, computer 151 is provided with a north-south output connected to a first differential 152 and with an east-west output connected to a second differential device 153. The two differentials 152 and 153 drive the bug in two coordinate directions to establish the position of the aircraft.

If there were no wind component in the motion of the aircraft, the differential device 152 and 153 would be unnecessary. However, it is necessary to correct the information from heading computer 151 to take cognizance of the speed and direction of the wind.

To correct for wind conditions, the system is provided with an integrating wind computer 154 that is essentially similar in construction to heading computer 151. Computer 154 has two mechanical inputs, one taken directly from a wind direction setting or adjustment device 75. The second input is derived from a wind speed setting device 74, which drives a rotary transducer 155. The output signal from transducer 155 is used to control the frequency of an oscillator 156, oscillator 156 being connected to a drive motor 158 through a suitable amplifier 159. Again, motor 158 may comprise an inexpensive synchronous pulse stepping motor having a minimal torque of the order of one inch ounce.

The principal controls of the system illustrated in FIG. 1 are described in greater detail hereinafter. Briefly, roll sensing device 101 directly drives attitude indicator 64, rotating the indicator in a clockwise or counterclockwise direction to show changes in roll attitude of the aircraft. The same instrument drives the two transducers 102 and 103 to produce output signals, as noted above, that are complementary in amplitude and polarity. The output signals from the transducers control the frequencies of the two oscillators 104 and 105. The output of each oscillator is amplified and limited, to produce a signal of substantially rectangular wave form, by the associated amplifier circuit. In each instance, the output of the oscillator, after amplification and shaping, is employed to drive one of the stepping motors 108 and 109. Motors 108 and 109 drive differential 110, producing a mechanical output from the differential that is directly related to changes in the roll attitude of the aircraft and is suitable for driving the auto-pilot.

The two variable-frequency generators comprising oscillators 104 and 105 and transducers 102 and 103, being connected in push-pull relationship, tend to reduce errors that might result in the system due to thermal drift or aging system components. The push-pull system employed also provides automatic correction for non-linearity of transducers 102 and 103. The overall stability of the illustrated system is of the order of 0.01%, using commeriacl components and known stable circuits, and this accuracy can be maintained over long periods of time and under a wide variety of operating conditions.

The same basic circuit is employed in connection with turn sensing device 111.

As noted above, the turn sensing device 111 may be connected mechanically to attitude indicator 64, but this is not essential because changes in yaw attitude are reflected in changes of aircraft heading, indicated by the rotational movement of the direction scale comprising radial lines 62 in display 32. The principal output from the turn sensing device 111, accordingly, is that derived from the two transducers 111 and 112, which directly control the operating frequencies of oscillators 114 and 115 respectively.

Changes in frequencies of the two oscillators are reflected in variations in rotational speed of the two stepping motors 118 and 119 driving the small gear differential 120. As long as the aircraft flys on a straight line without turning, sensing device 111 detects no change in the yaw attitude of the aircraft. Under these conditions, oscillators 114 and 115 operate at the same frequency and motors 118 and 119 rotate at substantially identical speeds. Accordingly, the output shaft of differential device 120 does not rotate and the radial indicator lines 66 in the display remain stationary. Whenever there is a turning movement of the aircraft, one of the motors 118 and 119 is driven faster than the other, there is an output from differential 120, and the radial grid comprising lines 66 rotates to indicate to the pilot that the aircraft is turning either left or right.

The foregoing description of performance of the turn rate control portion of the system is based upon the assumption that there is no change in the set heading. When a change in heading is desired, the new heading is set into the system by device 52, which adjusts the electrical bridge differential device 121. The resultant disturbance of the bridge balance causes the bridge to produce an output signal that drives the meter movement controlling the differential turn command pointer 67. As a consequence, the command pointer moves to the right or the left, depending upon the direction in which it is necessary to turn the aircraft in order to achieve the desired new heading. The pilot must then turn the aircraft toward the new heading; as the new preset heading is approached, bridge 121 returns toward its balanced condition and command pointer 67 moves back toward its normal alignment with the center line 69 of the display. As the aircraft nears the new heading, the increasing proximity of command pointer 67 to center line 69 automatically guides the pilot in making a smooth flare-out frόm his turn. Of course, during the period in which the aircraft actually turns, the radial grid 66 rotates, so that the pilot is fully aware of the fact that the aircraft is turning.

In the initial portion of each flight, while the aircraft is being brought to the desired altitude, attitude, and heading, it is usually preferable to leave switch 122 open. Once the aircraft is flying on the desired heading, switch 122 can be closed. Thereafter, if a new heading is set in device 52, the unbalanced output signal from bridge 121 resulting from the heading change is applied to oscillator 105 to create an unbalanced condition between the operating frequency of oscillator 105 and oscillator 104. The resulting unbalanced condition in the roll control system is interpreted by that system as a banking movement of the aircraft, even though no actual bank has occurred and the roll sensing device 101 continues to show the aircraft is in level flight. The auto-pilot connected to differential device 110 automatically operates to correct this error signal, representing an apparent banking of the aircraft, banking the plane in the opposite direction and therefore turning the aircraft.

When the turning aircraft reaches the new heading that has been set into device 52, the output from bridge 121 again is reduced to a zero level and there is no further output signal supplied from the bridge to oscillator 105. Accordingly, the auto-pilot no longer attempts to correct for the error signal produced by the heading change, and flight is resumed on a level basis.

The control system of FIG. 1 moves the horizontal grid lines 65, sometimes referred to herein as the speed grid or speed scale, in accordance with rate variations between the air speed setting of device 54 and the actual air speed determined by device 128. It will be observed that the control system is essentially identical to that for the roll and turn control systems except that two input devices are used instead of one. Motor 135 is actuated in accordance with directly sensed air speed information from device 128, the control components including the air speed sensing device 128, transducer 127, oscillator 126, amplifier 134 and motor 135. Motor 141, on the other hand, is driven at a speed determined by the setting of device 44 through the chain of control devices comprising transducer 137, oscillator 138 and amplifier 139. Deviations of the actual air speed from the preset air speed are reflected in rotational movement of the output shaft of differential 136, which is driven by the two motors 135 and 141.

If the actual air speed exceeds the preset air speed, then the output shaft of differential 136 drives the speed grid 65 downwardly within window 32, giving the direct illusion that the plane is rushing forwardly over the ground at an excessive rate. Conversely, if the actual air speed is below the preset air speed, the lines of the speed scale move forwardly within the window, creating the illusion that the aircraft has slowed down to a point where it is "backing up." In connection with the speed grid 65 and the radial turning grid 66, rate information is employed instead of actual performance information because the objective of the system is to inform the pilot only with respect to changes from the predetermined flight conditions. Stated differently, there is no necessity for the pilot to gauge the actual speed of movement of either of these grids; if either grid moves, then the pilot knows that the aircraft has deviated from the planned flight.

Pitch sensing device 125 moves indicator 64 upwardly and downwardly within the display field of device 32 to indicate diving or climbing movement of the aircraft. The output from oscillator 126, which is indicative of changes in air speed, is discriminated, differentiated, and amplified in circuits 129, 131, and 132 to obtain a DC signal having an amplitude proportional to acceleration of the aircraft and a polarity representative of the direction of that acceleration. That is, the polarity of the output signal from circuit 132 indicates whether the aircraft is accelerating in a forward direction or is decelerating. Motor 133, which is a small DC magnetic torque motor, rotates in a direction determined by the polarity of the input signal and through an arc determined by the amplitude of that signal. This affords a correction in pitch sensing device 125 to prevent pitch errors in the sensing device, which would otherwise be occasioned by changes in acceleration of the aircraft, from being displayed. Thus, if the aircraft accelerates forwardly but maintains level flight, pitch sensing device 125 tends to produce an output indicating that the aircraft is climbing. This is corrected by the motor 133 so that the display continues to afford an accurate indication of the actual pitch attitude of the aircraft. The same correction applies, of course, upon deceleration.

Heading computer 151, which is described in greater detail hereinafter, resolves the actual heading information derived from differential 120 of the air speed information from motor 135 into two integrated coordinate movements. The computer is provided with two output shafts, one of which drives differential 152 and the other of which drives differential 153. If there were no wind, the outputs of computer 151 could be used directly to drive the position indicator bug of plotter 71 to show the aircraft position. Again, it is necessary to correct this information for wind conditions and this is accomplished by the coordinate outputs of the similar computer 154.

ROLL ATTITUDE CONTROL SYSTEM

The principal components of the roll attitude control system used to actuate the main display 32 are shown in substantial detail in FIGS. 2 through 5. A modified form of the roll attitude sensing device that is a principal component of this system is shown in FIG. 6.

Figure 2:
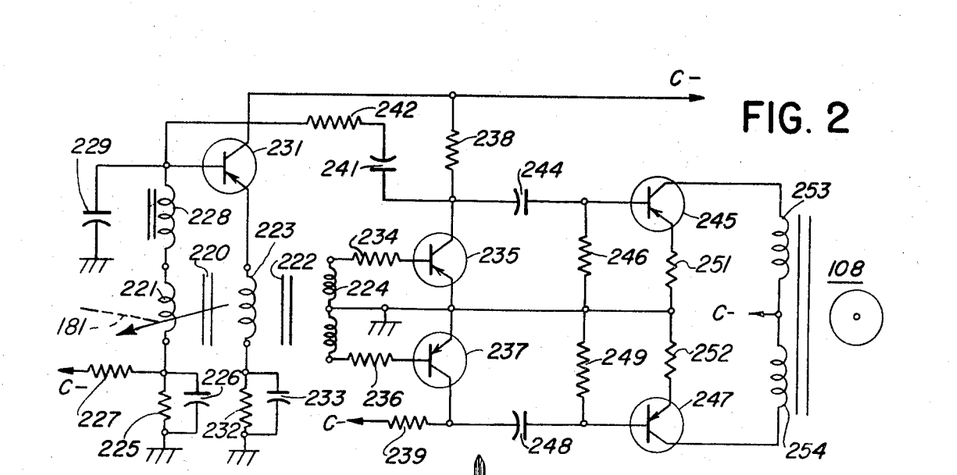
FIG. 2 is a schematic circuit diagram of a control circuit used in the roll attitude indicator portion of the system of FIG. 1.

FIG. 2 illustrates, in detail schematic form, the operating circuits for the transducer 102, oscillator 104, limiting amplifier 106 and motor 108. Transducer 103 comprises a rotary transformer that includes a rotatable core 220 connected to the shaft 181 of a roll sensing device 101A (FIG. 4) and carrying a winding 221. Core 220 rotates with respect to a stationary core 222 upon which are wound a primary winding 223 and a secondary winding 224. One terminal of rotatable winding 221 is returned to ground through a biasing circuit comprising a resistor 225 connected in parallel with a capacitor 226. This same terminal of winding 221 is connected to an adjustable bias voltage supply through a resistor 227. The other terminal of rotatable winding 221 is connected to one terminal of an inductance 228 which is connected in series with capacitor 229 that is returned to ground. Capacitor 229 and coil 228 constitute the frequency-determining circuit of oscillator 104.

Oscillator 104 includes a transistor 231 having its base electrode connected to the common terminal of capacitor 229 and coil 228. The emitter of transistor 231 is connected to one end of primary winding 223 of the transformer, the other terminal of this winding being returned to ground through a parallel RC circuit comprising a resistor 232 and a capacitor 233. The collector of the transistor is connected to a negative voltage supply herein designated as C—.

The output from oscillator 104 is taken from the secondary winding 224 of the transformer. The electrical center point of the transformer winding 224 is grounded. One terminal of the winding is connected through a resistor 234 to the base electrode of a transistor 235. The other terminal of winding 224 is connected through a resistor 236 to the base electrode of a second transistor 237. The emitters of the two transistors are returned to system ground. The collector of transistor 235 is connected to the C— supply through a load resistor 238. The collector of transistor 237 is connected to the C— supply through a load resistor 239. The collector of transistor 235 is also connected back to the base electrode of transistor 231 through a feedback circuit comprising the series combination of a capacitor 241 and a resistor 242.

Transistors 235 and 237 comprise the first push-pull stage of a limiter-amplifier 106; this stage functions primarily as a limiter. The second stage of the amplifier is also a push-pull circuit and comprises two transistors 245 and 247. The base electrode of transistor 245 is coupled to the collector of transistor 235 in the preceding limiter stage by a coupling circuit that comprises a series capacitor 244 and a resistor 246 that returns the base electrode to ground. A similar coupling circuit comprising a capacitor 248 and a resistor 249 couples the base electrode of transistor 247 to the collector electrode of transistor 237. The emitter electrodes of transistors 245 and 247 are returned to ground through two resistors 251 and 252 respectively.

Motor 108 is a conventional pulse motor having a split input winding comprising two coils 253 and 254. The two windings are connected together and returned to the C— supply. One terminal of winding 253 is connected to the collector of transistor 245. The corresponding terminal of winding 254 is connected to the collector of transistor 247.

The operating circuit for the rotary transducer 102 and oscillator 104, as shown in FIG. 2, is essentially similar to the circuit described in Pat. No. 2,707,232 to Robert Adler except that the present circuit is constructed with transistors instead of vacuum tubes. An essentially similar circuit is also shown in Pat. No. 3,038,960 of Robert Adler and Myron L. Anthony. Accordingly, only a brief description of the circuit operation is presented herein.

Insofar as oscillator 104 is concerned, the circuit of FIG. 2 operates as an emitter follower having a frequency determined by the capacitor 229 and the inductance 228, the inductance of the transformer winding 221 being very small in comparison to coil 228. The feedback circuit of the oscillator includes the transistor 235, which is biased to operate as a limiting amplifier, and the coupling circuit comprising capacitor 241 and resistor 242. The fundamental operating frequency for the oscillator 104 is not critical, but is selected to be within the operating capabilities of motor 108. Typically, the oscillator may operate with a center frequency of the order of one hundred sixty cycles per second.

With the circuit in operation, rotation of the shaft 181 connected to core 220 may be employed to rotate the core and winding 221 and thereby develop in the winding 221 a signal which may be either a bucking or a boosting signal relative to the bias signal applied to the winding 221. For an induced signal of one polarity, the apparent capacitance of the circuit 228, 229, is increased; an induced signal of opposite polarity results in an apparent decrease in the capacitance of the circuit. Accordingly, rotation of core 220 effectively increases or decreases the operating frequency of the oscillator 104, depending upon the direction of rotation. Furthermore, the amount of the frequency change is determined by the angle through which the rotary transformer core is rotated.

The output signal from oscillator 104, derived at the secondary winding 224 of the transformer, is amplified in circuit 106. This circuit functions as a limiting amplifier, producing a square wave signal of essentially constant amplitude at the output, taken from the collector electrodes of transistors 245 and 247. Pulse motor 108 is always driven in a given direction, the speed of rotation of the motor being directly related to and determined by the frequency of the output signal from oscillator 104.

As noted hereinabove, the basic circuit employed for devices 102, 104, 106 and 108 (see FIGS. 1 and 2) is also employed for the complementary portion of the roll attitude control system comprising transducer 103, oscillator 105, amplifier 107 and motor 109. Accordingly, the latter circuit is not shown in detail in the drawings. The two motors 108 and 109 (FIG. 1) drive the gear differential 110 at a rate that is determined by the difference, if any, in the output speeds of the two motors. Differential 110 is described in detail hereinafter in connection with FIG. 5.

Figure 3:
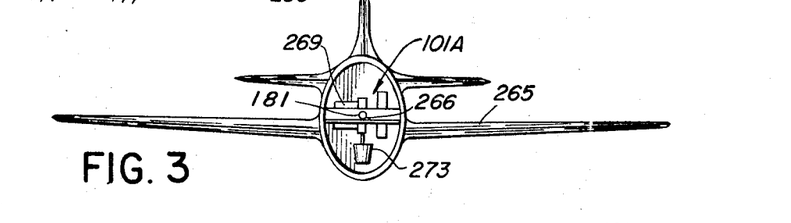
FIG. 3 illustrates the orientation of a mechanical roll sensing device of the invention within an aircraft.
Figure 4:
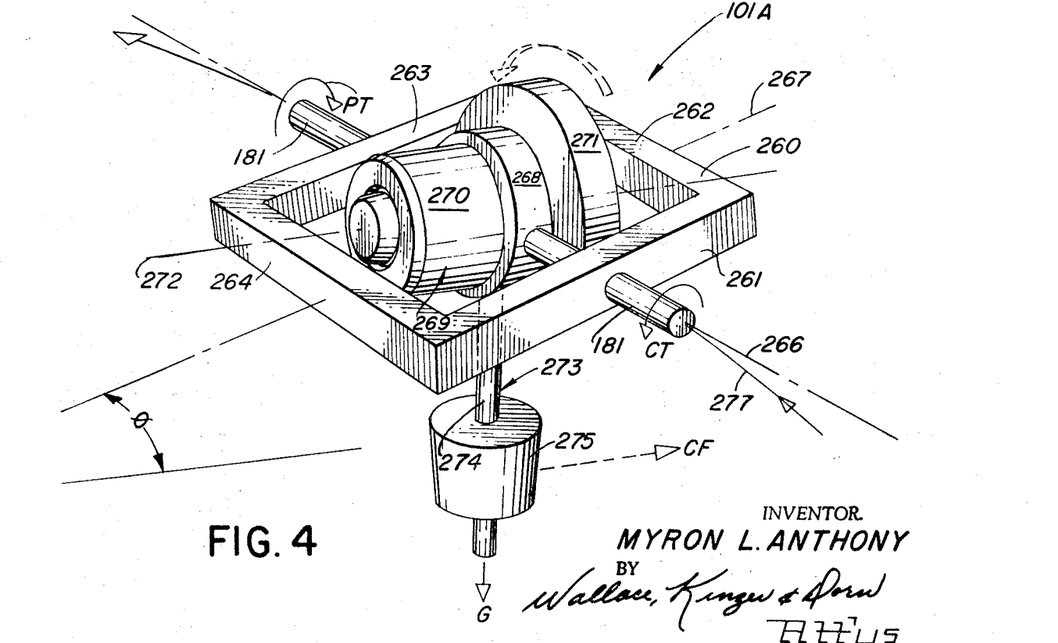
FIG. 4 is a perspective view of the roll sensing device.

FIGS. 3 and 4 illustrate one form of roll sensing device 101A that may be utilized as the roll sensing element 101 (FIG. 1) of the roll attitude control system. In FIG. 3, the size of device 101A has been greatly exaggerated; this view is presented solely to illustrate the orientation of device 101A in an aircraft.

As shown in FIGS. 3 and 4, device 101A comprises a frame 260 of rectangular configuration including four side frame members 261, 262, 263 and 264. Frame 260 is mounted in fixed position within the aircraft 265 (FIG. 3) with the frame members 262 and 264 extending parallel to the longitudinal axis 266 of the aircraft and with frame members 261 and 263 extending parallel to the horizontal transverse axis 267 of the aircraft.

The shaft 181 extends across frame 260 between frame members 261 and 263; it is this shaft that drives transducers 102 and 103 and attitude indicator 64 (FIGS. 1 and 2). Shaft 181 is aligned parallel with the longitudinal axis 266 of the aircraft and preferably is centered on that axis. Within the central opening of rectangular frame 260, a mounting ring 268 is mounted on the shaft. Preferably, the shaft 181 is constructed in two sections that are bridged by the mounting ring 268, the connection between the two shaft sections and the mounting ring being a rigid mount such that the shaft, to all intents and purposes, is continuous.

A gyro 269 comprising a small constant speed electrical motor 270 and a flywheel 271 mounted on the motor shaft is supported within mounting ring 268. With the illustrated construction, it is seen that the gyro 269 is a semi-rigid device that is limited to pivotal movement about the axis 266. Furthermore, it should be noted that axis 266 is normal to the axis of rotation 272 of the gyro.

Device 101A further includes a pendulum 273 comprising a depending rigid shaft 274 affixed to mounting ring 268 and a weight 275 that is mounted upon shaft 274. Preferably, weight 275 is threaded or otherwise adjustably mounted upon the shaft 274 so that the weight can be adjusted upwardly or downwardly of the shaft for dynamic balancing of sensing device 101. It will be seen that the mounting arrangement for pendulum 273 limits the pendulum to pivotal movement about the axis 266 which, as noted above, is parallel to or coincident with the longitudinal axis of the aircraft.

Rotational movement of shaft 181, in device 101A, is conjointly determined by the effect of the precession torque of gyro 269 and the centrifugal torque of pendulum 273. Assuming initially that aircraft 265 is rotated or rolled about its longitudinal axis 266 with no turning movement of the aircraft, it is seen that pendulum 273 rotates shaft 181 through an angle determined by the rolling movement of the aircraft. As long as there is no turning movement of the aircraft, gyro 269 applies no precession torque to the shaft. Accordingly, the rotational movement of the shaft may be taken directly as an accurate indication of the roll attitude of the aircraft.

Ordinarily, any rolling or banking movement of the aircraft is accompanied by a turning movement of the aircraft about some center, usually located a substantial distance from the aircraft. It is possible, however, to turn the aircraft without a rolling movement thereto. If it is assumed that the aircraft is engaged in a flat turn along the arc 277, it is seen that the centrifugal force of pendulum 273, indicated by the arrow CF, tends to rotate shaft 181 in a counterclockwise direction as indicated by arrow CT. That is, arrow CT represents the centrifugal torque applied to shaft 181 as a result of the angular acceleration of the aircraft.

If incorrect, torque CT would give an erroneous indication of the roll attitude of the aircraft since, as noted above, it has been assumed that the aircraft is proceeding in a perfectly flat turn and has not been banked. But gyro 269 exerts a compensating precession torque PT on shaft 181 that is directed oppositely to the centrifugal torque CT. With proper adjustment of the pendulum weight 275, the precession torque PT and the centrifugal torque CT may be equalized for a selected normal operating speed for the aircraft. Device 101A may be calibrated to permit adjustment of the weight for different speeds, such as the cruising speed of the aircraft, economy cruising speed, and like preset speeds at which the aircraft is normally operated.

In a banked turn, that portion of the torque exerted upon shaft 181 that is the result of the angular velocity of the aircraft is effectively cancelled by the opposing precession torque of gyro 269. The differential torque exerted by the pendulum as a result of banking of the aircraft results in rotational movement of shaft 181 that affords an accurate indication of the roll attitude of the aircraf. As noted above, shaft 181 is connected to the aircraft indicator 64 of the main display 32 (see FIG. 1) to provide the pilot with a continuous indication of the instantaneous roll attitude of the aircraft. As can be seen from the foregoing description, display indication is the sum of the precission torque of the gyro 269 and the free pivotal movement of the pendulum 274, the precession torque being equal to that component of the pendulum movement that is determined by centrifugal force on the pendulum resulting from turning movement of the aircraft.

Roll sensing device 101A is, of course, the input device for the circuit of FIG. 2 in the roll attitude control system. The output device is the differential 110. One form of gear differential 110A that may be employed is illustrated in FIG. 5.

Figures 5, 5A:
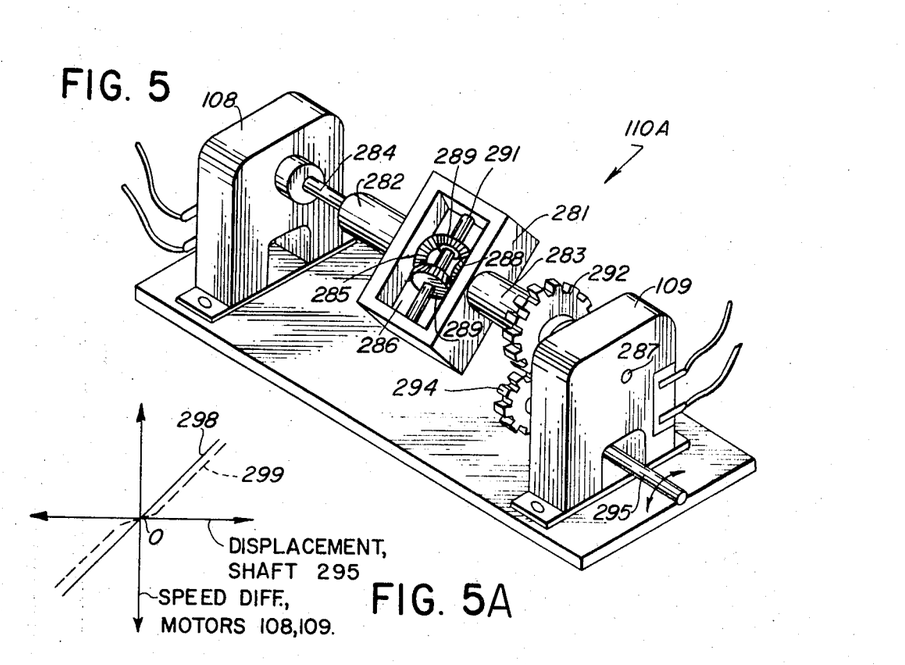
FIG. 5 is a perspective view of a differential adding mechanism used in one embodiment of the control system.
FIG. 5A is an explanatory diagram illustrating operating characteristics of certain integrating apparatus used in the control system.
Figure 6:
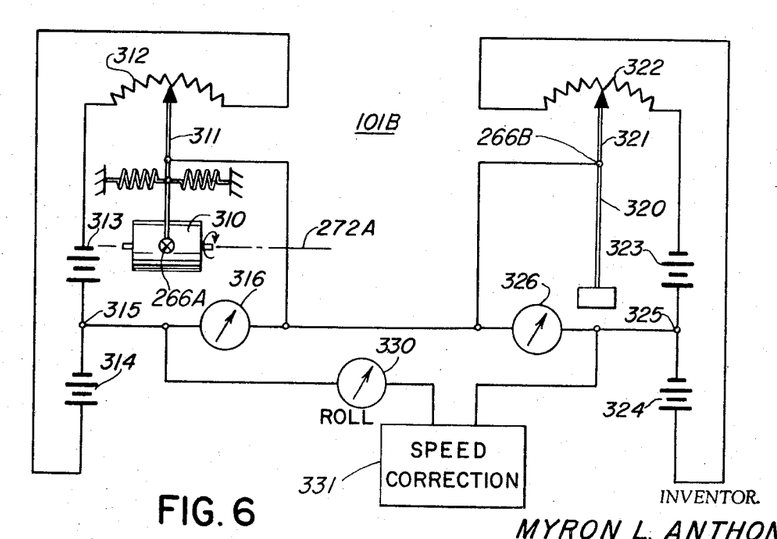
FIG. 6 is a schematic circuit diagram for an electrically operated roll sensing device.

As shown in FIG. 5, differential 110A includes a frame 281 of generally rectangular configuration having two hollow stub shafts 282 and 283 affixed to the frame and projecting outwardly of opposite sides of the frame in alignment with each other. The shaft 284 of motor 108 extends through hollow shaft 282 and through the wall of the frame into the central opening 286 in the interior of the frame. A small gear 285 is mounted on the end of shaft 284. Similarly, the output shaft 287 of motor 109 extends through the hollow shaft 283 into the interior opening 286 of frame 281, the two motor shafts being coaxially aligned. A small bevel gear 288 is mounted on the end of shaft 287. Gears 285 and 288 are both disposed in meshing engagement with a pair of complementary bevel gears 289 mounted upon a shaft 291 that extends across the central opening 286 of the differential frame 281 normal to the common axis of shafts 284 and 287.

A pinion gear 292 is affixed to shaft 283. Gear 292 is disposed in meshing engagement with a spur gear 294 mounted upon the output shaft 295 of the differential 110.

Gear differential devices such as device 110A are well known in the art and are commercially available. Consequently, only a brief description of operation of the gear differential is presented herein. The outputs of shafts 284 and 287 of motors 108 and 109, respectively, rotate in opposite directions. As long as the shaft speeds are equal frame 281 remains stationary. Whenever one of the motors rotates its shaft at a higher speed than the shaft for the other motor, however, this speed differential is translated into rotational movement of frame 281, through gears 285, 288 and 289. Furthermore, the direction of rotation of frame 281 is determined by and is indicative of the motor that has exceeded the speed of the other motor.

Thus, if motor 108 runs faster than motor 109, gear differential frame 281 may rotate in a clockwise direction. Conversely, if motor 109 exceeds the speed of motor 108, then the gear box rotates in a counterclockwise direction. The rotational movement of frame 281 is translated to output shaft 295 through gears 292 and 294. It is thus seen that the angular displacement of shaft 295 is the time integral of the cumulative variations in rotational speeds of motors 108 and 109 with respect to each other.

FIG. 5A illustrates the relationship between angular displacement of shaft 295 and the differential in rotational speeds of motors 108 and 109. As shown by the linear plot 298 in FIG. 5A, the shaft displacement should be a direct linear function of the speed differential and should pass through a point of zero displacement when the speeds are equal.

With an integrating device required to operate through or about a zero point, as illustrated in FIG. 5A, there is a substantial tendency toward the introduction of hysteresis error at or near the zero point. This is generally indicated by the dash line plot 299, showing the pattern followed by many integrating devices; note the distorted "dead" band near the zero point. A hysteresis error of this kind cannot be tolerated in an aircraft instrumentation system, particularly where heading or direction is derived from the time integral of the rate of turn. Generally speaking, the digitized push-pull drive and gear differential integrator system of the present system, as disclosed in FIGS. 1, 2 and 5, reduces this and other integrating errors to a minimum. Over long periods of time, observed error has been held below 0.01%.

Further reduction of hysteresis error in the integrating system, and particularly in the differential device, though normally not essential, can be accomplished by continually varying the motor speeds, complementally to each other, over a relatively small range. This may be accomplished by a small-amplitude balanced repetitive mechanical movement of the rotary transducer core 220. The resulting "dithering" movement of the rotary transducer is effective to insure against any possible introduction of a "dead" band near the zero position, of the form illustrated by dash line 299 in FIG. 5A, due to friction in the transducer or the sensing device.

FIG. 6 illustrates a modified form 101B of a roll sensing device that may be employed as the roll sensing apparatus 101 in the control system of FIG. 1. At the left-hand side of device 101B, as illustrated in FIG. 6, there is a conventional single-gimbal pivoted gyro 310 comprising a small constant speed high speed motor with a flywheel. Gyro 310 is so mounted that the pivotal axis 266A of the gyro is parallel to or coincident with the longitudinal axis of the aircraft. The rotational axis 272A of the gyro is parallel to the transverse axis of the aircraft so that the precession torque of the gyro is proportional to angular velocity of the aircraft about an axis parallel to the vertical axis of the aircraft.

A rheostat arm 311 is connected to the gyro 310, the resistance 312 of the rheostat being connected in series with two batteries 313 and 314. Common terminal 315 of the batteries and rheostat arm 311 comprise the output terminals. An indicating instrument, a voltmeter 316, is included in series in this circuit. This completes a quite conventional instrument of the kind once referred to as a "turn indicator," that actually measures angular velocity of the aircraft about its vertical axis.

Device 101B further includes a pendulum 320 that is mechanically connected to a rheostat arm 321. The pivotal axis 266B of pendulum 320 is parallel to and preferably coincident with the longitudinal axis of the aircraft. Consequently, the pivotal movement of pendulum 320 represents the combined effect of rotation of the aircraft about its longitudinal axis and angular turning velocity of the aircraft about an axis parallel to the vertical axis of the aircraft.

The resistance 322 of the rheostat that includes arm 321 is connected in series with two batteries 323 and 324. The common terminal 325 and the rheostat arm 321 comprise the output terminals. An indicating voltmeter 326 is incorporated in series in this circuit. This arrangement is essentially the same as a conventional pendulum-type instrument of the kind known as a "bank indicator."

For accurate continuous indication of the roll attitude of the aircraft, a voltmeter 330 is connected between the gyro-controlled and pendulum-controlled circuits, from terminal 315 to terminal 325. Thus, instrument 330 affords an indication of the voltage differential, if any, between terminals 315 and 325. A speed correction circuit 331 may be connected to the attitude indicating instrument 330 as discussed hereinafter.

In a perfectly flat turn, arm 311 of the gyro-controlled rheostat is displaced clockwise or counterclockwise, depending upon the direction of the turn, in response to the precession torque of the gyro. At the same time, pendulum 320 is displaced angularly as a result of the angular acceleration produced by the turn. The system may be calibrated, particularly by adjusting of pendulum 320, so that the voltages across resistors 317 and 327 are equal during a flat turn. With no unbalanced condition present, attitude indicator 330 properly shows that the aircraft is maintaining level flight.

If the aircraft is rolled about its longitudinal axis, without turning, the rheostat arm 311 is not displaced, there being no precession torque output from gyro 310. But pendulum 320 is displaced in a direction and by an amount determined by the banking or rolling of the aircraft. As a consequence, a voltage of given direction and amplitude is developed across resistor 322 and this voltage is sensed and indicated by the attitude instrument 330.

In a banked turn, the gravity-induced movement of pendulum 320 resulting from banking of the aircraft is partially or completely offset by the centrifugal force applied to the pendulum as a result of angular acceleration of the aircraft. By definition, in a perfectly banked turn, the two forces are equal, gravity balancing the angular acceleration on the pendulum. Consequently, the bank circuit controlled by the pendulum remains balanced. But the turning motion of the aircraft produces a substantial unbalanced condition in the circuit controlled by gyro 310, resulting in the development of an appreciable voltage differential at terminal 315 as compared with terminal 325. The polarity of this voltage difference is determined by the direction of the turn, which is of course a function of the direction in which the plane has been banked. Consequently, the unbalanced voltage applied to attitude instrument 330 accurately reflects the changed attitude of the aircraft. In an imperfectly banked turn, of course, the voltages developed at terminals 315 and 325, and applied to instrument 330, are unequal; instrument 330 resolves the two voltages and affords a direct indication of aircraft attitude.

As in the case of device 101A, roll sensing apparatus 101B may be affected somewhat by changes in the forward speed of the aircraft. This is not a series limitation on either device, however, since aircraft are normally operated within a rather narrow speed range. If necessary, a velocity correction signal may be applied to the attitude indicator 330 from an appropriate correction circuit 331.

A conventional meter movement suffices to drive instrument 330 for a roll attitude display not integrated with the display of additional attitude information. For an integrated display, a suitable motor may be used.

PITCH ATTITUDE CONTROL SYSTEM

FIGS. 2 and 7 through 9 illustrate the principal operating components for the pitch attitude control system that controls vertical movements of attitude indicator 64 in the main display 32 (see FIG. 1). As noted above, the digitized integrating circuits for this portion of the control system can be essentially identical to those used in the roll attitude control system and described hereinabove in connection with FIG. 2. Accordingly, there is no need to repeat the description of this portion of the pitch control system.

Figures 7, 8:
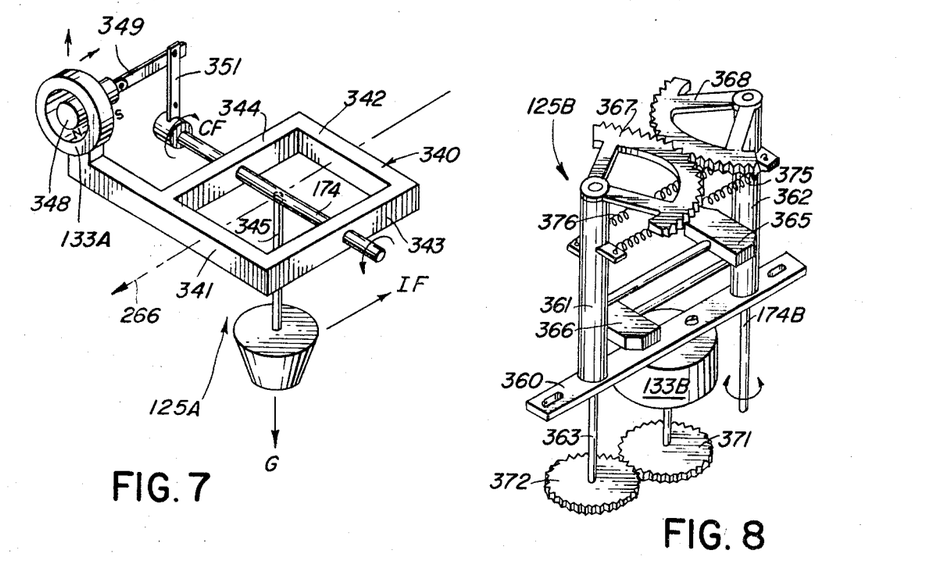
FIG. 7 is a perspective view of one form of pitch sensing device that may be used in the control system.
FIG. 8 illustrates, in perspective, another form of pitch sensing device.

FIG. 7 illustrates a first simple form of pitch sensing device 125A that may be incorporated in the control system of FIG. 1. Device 125A comprises a frame 340 of rectangular configuration comprising front and rear frame members 341 and 342 and opposed side frame members 343 and 344. Side frame members 343 and 344 are parallel to the longitudinal axis 266 of the aircraft.

Pitch sensing device 125A includes a pendulum 345 that is suspended from the shaft 174 comprising the output shaft for the device. Shaft 174 extends across frame 340, being supported in and journalled in suitable bearings in the side frame members 343 and 344. Thus, the axis of rotation of shaft 174, which is the rotational axis for pendulum 345, is parallel to the transverse axis of the aircraft and is normal to the longitudinal axis of the aircraft.

The front frame member 341 of frame 340 is extended and a solenoid device 133A is mounted upon the extension portion thereof. Device 133A comprises a coil that encompasses a magnetic armature 348. Armature 348 is mounted upon a support arm 349. Support arm 349 is pivotally connected to a lever 351 affixed to one end of shaft 174. Solenoid 133A is provided with suitable electrical connections and is energized in accordance with a speed correction signal derived from the discriminator differentiator circuit 131 as described hereinafter. Thus, for this particular form of pitch sensing device, solenoid device 133A represents the motor 133 shown in the control circuit diagram of FIG. 1.

In operation, when the plane remains in level flight, pendulum 345 points directly downwardly at the floor of the aircraft. If the aircraft noses down, the pendulum is displaced, rotating shaft 174 and affording a direct indication that the pitch attitude of the aircraft has changed. With the display mechanism illustrated in FIG. 1, this change in pitch is indicated by a vertical downward movement of aircraft indicator 64. On the other hand, if the nose of the plane is brought up, pendulum 345 rotates shaft 174 in the opposite direction. This affords a positive indication of the change in pitch attitude and is shown as an upward movement of the aircraft indicator 64.

The simple pendulum device of FIG. 7 would be subject to error as a result of acceleration of the aircraft, but this error is corrected by device 133A. Thus, if the aircraft is accelerated in a forward direction, the resulting inertia force IF on pendulum 345 tends to pivot shaft 174 in a counterclockwise direction, indicating that the aircraft has nosed up. But this tendency on the part of the pendulum is counteracted by the solenoid 133A, which is energized by the acceleration signal from discriminator differentiator 132. Similarly, inertia forces on the pendulum resulting from deceleration of the aircraft are compensated by solenoid 133A. With proper calibration, accordingly, device 125A may be effectively corrected for changes in acceleration of the aircraft.

Device 125A, as illustrated, leaves pendulum 345 free to rotate through a complete circular arc. Hence, the pendulum, if free of all external influences other than gravity, would point downwardly for all attitudes of the aircraft. But the acceleration correction solenoid 133A can only respond to displacements of much smaller amplitude; typically, the acceleration corection may be made operative over a total change in pitch of about plus or minus 30°. This is not a serious disadvantage, since sharp diving or climbing movements are not encouraged in the operation of most aircraft, and indeed, should be avoided, especially under IFR conditions. However, acceleration correction over a full 360° arc can be provided by substituting a permanent magnet rotary solenoid for the simple toroidal core linear solenoid device 133A.

Even with a rotary solenoid correction device, pitch sensing device 125A is not fully accurate for aerobatic maneuvers such as a full loop. The pendulum is subject to disturbances resulting from centrifugal force if the attitude of the aircraft is changed severely as in a looping maneuver. Thus, at the end of the first 90° movement in a loop, the normal gravitational force would tend to deflect the pendulum to a position parallel to the floor of the aircraft. But the centrifugal force on the pendulum resulting from the turn of the aircraft in the vertical plane is normal to the aircraft floor and causes the pendulum to move radially outwardly from the center of the loop, resulting in a pitch indication that is not entirely accurate. Nevertheless, the direction of displacement of the pendulum is still correct with respect to the basic aircraft attitude and thus always permits correction of the aircraft to resume level flight.

FIG. 8 illustrates another embodiment of pitch sensing device in the form of a dual pendulum mechanism 125B. Device 125B comprises a base frame member 360 oriented transversely of the longitudinal aircraft axis 266 and extending substantially parallel to the horizontal aircraft axis. A pair of vertically extending hollow support and bearing members 361 and 362 are mounted at the opposite ends of frame member 360. A shaft 363 extends through bearing post 361 and projects downwardly below frame member 360. A similar shaft 174B, which is the output shaft for the device, extends through bearing post 362 and projects below frame member 360.

A first horizontal pendulum member 365 is affixed to shaft 363, the pendulum shaft projecting outwardly through bearing post 361 through a suitable slot in the bearing post. A second similar horizontal pendulum member 366 is mounted upon shaft 174B. At the top of shaft 363, a sectional gear 367 is affixed to the shaft. Gear 367 is disposed in meshing engagement with a similar gear 368 that is affixed to the upper end of shaft 174B.

A rotary solenoid motor 133B is mounted upon the central portion of frame member 360. The lower end of the shaft for motor 133B carries a penion gear 371. Gear 371 is aligned in meshing engagement with a gear 372 that is mounted on the lower end of shaft 373. Solenoid motor 133B is electrically connected to discriminator differentiator circuit 131. A pair of springs 375 and 376, each attached to one of the bearing posts and connected to the shaft in the other bearing post, normally maintain the mechanism in the initial or zero position shown in FIG. 8.

It will be recognized that the pitch sensing device 125B, as illustrated in FIG. 8, comprises a balanced "tilt" pendulum. Again, movement of the pendulum mechanism is compensated for change in acceleration by means of the rotary motor 133B and its driving connection to the shaft 363 of pendulum 365. The pendulum assembly is spring biased to its center position, representative of level flight. The displacement of the two pendulums 365 and 366 is relatively small even for extreme changes in pitch attitude.

In the balanced pendulum mechanism of FIG. 12, the two tilt pendulums 365 and 366 are free to move only in a plane parallel to the floor of the aircraft. The orientation of the two pendulums, one on the left and one on the right, tends to cancel any transient disturbances caused by slipping motion of the aircraft in a sideways direction.

An important feature of device 125B is that it tends to minimize any disturbing effects due to centrifugal force resulting from extreme changes in pitch attitude. The centrifugal force on the two pendulums is proportional to the angular acceleration and to the sine of the angle of displacement of the pendulum with reference to the floor of the aircraft. As long as the pendulums are restrained by the springs 375 and 376 and are prevented from large excursions from their normal positions, the centrifugal force component, acting in the direction of gravity, will produce only very small disturbing forces. Thus, device 125B continues to afford substantially accurate pitch information even when the aircraft goes through relatively large pitch excursions and extremes of acceleration.

Figure 9:
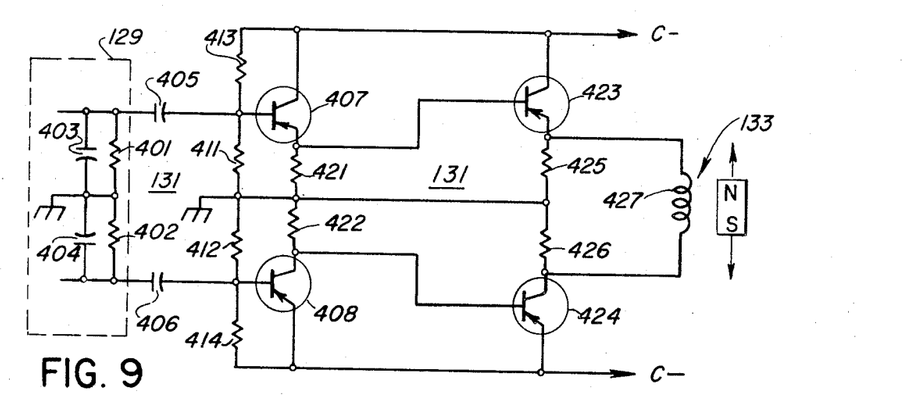
FIG. 9 is a schematic circuit diagram of an acceleration correction circuit usable with the pitch sensing devices of FIGS. 7 and 8.

FIG. 9 illustrates a substantial portion of the operating circuits that control the pitch correction solenoid motor 133 (see FIG. 1). The initial portion of this circuit is the conventional frequency discriminator 129; because a number of suitable discriminator circuits are well known in the art, the circuit has not been shown in detail. By way of example, one suitable form of discriminator that may be employed, and that affords adequate accuracy and consistency in operation, is that shown in Pat. No. 3,024,419 of Myron L. Anthony. In FIG. 9, only the output portion of discriminator 129 is illustrated, comprising the two output resistors 401 and 402, these two resistors being connected together in balanced relation and returned to system ground. Two capacitors 403 and 404 are connected in parallel with resistors 401 and 402 respectively.

The first output resistors 401 of the discriminator circuit is connected through a coupling capacitor 405 to the base electrode of a first transistor 407. Similarly, the output resistor 402 of the discriminator is coupled through a capacitor 406 to the base electrode of a transistor 408. Capacitors 405 and 406 constitute the differentiating circuit 131. The base electrode of transistor 407 is returned to ground through a resistor 411 and is also connected to a DC supply, herein designated as C—, through a resistor 413. Similarly, the base electrode of transistor 408 is connected to the C— supply through a resistor 414 and to system ground through a resistor 412.

The emitter electrodes of transistors 407 and 408 are returned to ground through two load resistors 421 and 422 respectively. The collector of each of these two transistors is connected directly to the C— supply. The emitter of transistor 407 is connected to the base electrode of a transistor 423, whereas the emitter of transistor 408 is connected to the base of a further transistor 424. The collectors of transistors 423 and 424 are each connected directly to the C— supply. The emitter electrodes of these two transistors are returned to ground by means of two respective load resistors 425 and 426. The emitter electrodes are also connected to the end terminals of a solenoid coil 427 constituting the operating winding for the solenoid motor 133.

The output signal from discriminator circuit 129, including the output resistors 401 and 402, is a push-pull DC signal. The amplitude of this signal is proportional to the air speed of the aircraft, since the operating frequency of oscillator 126 (FIG. 1) that drives the discriminator varies in frequency in accordance with air speed. The voltages applied to the base electrodes of transistors 407 and 408, through coupling capacitors 405 and 406, circuit 131, vary in accordance with the first time derivative of the air speed voltage. Accordingly, the input signal to the push-pull limiter amplifier comprising transistors 407 and 408 is proportional to the rate of change of air speed of the aircraft and hence to the acceleration of the aircraft.

Because the two input transistors 407 and 408 in the operating circuit for solenoid motor 133 are connected as emitter followers, they present a high load impedance for the discriminator output. The amplifiers comprising transistors 407 and 408 drive the second push-pull stage comprising transistors 423 and 424, the two sides of this stage also being connected, in each instance, in an emitter follower configuration. This affords a low resistance source for energizing the operating winding 427 of the correction solenoid 133. Due to the short-circuiting effect of this low impedance source in the terminal stage of amplifier 132, the solenoid is highly damped and affords effective and controllable mechanical velocity damping to the solenoid armature and to the pitch pendulum system.

SPECIFIC CIRCUIT DATA

In order to afford a more complete disclosure of the invention, by way of specific example, specific circuit parameters are set forth hereinafter with respect to the circuits illustrated in FIGS. 2 and 9. It should be understood that these data are presented only as exemplary information and in no sense as a limitation on the invention:

Resistors:
    227—33 kilohms
    225, 238, 239, 246, 249, 421, 422—10 kilohms
    232—2.2 kilohms
    234, 236—220 kilohms
    242, 411, 412, 413, 414—220 kilohms
    251, 252—100 ohms
    425, 426—1 kilohm
Capacitors:
    226, 233—10.0 microfarads
    229—0.5 microfarad
    241—0.01 microfarad
    244, 248—1.0 microfarads
    405, 406—2.0 microfarads
Inductances:
    228—2 henries
Power supply:
    C— — —12 volts D.C.

CONCLUSION

From the foregoing description it will be apparent that the display system, as illustrated particularly in FIG. 1, presents to the pilot of an aircraft an instantly understandable display of the flight performance of the aircraft. The essential information with respect to aircraft attitude, speed, and direction of movement is presented in a manner that is essentially analogous to the corresponding information derived by the pilot when flying on the basis of visual observation, but with the aircraft itself taken as a fixed reference. For a given flight, from point to point, the pilot flies entirely by the main attitude display 32. Momentary diversion of his attention is not dangerous, since the movements of the display elements, and particularly the speed grid 65 and the turning grid 66, are easily detectible through the peripheral vision of the pilot.

An important aspect of the control and display system of the present invention is the treatment of the basic roll, pitch and turn rate information. The transformation of the initial mechanical data from the basic detecting devices, through accurate rotary transducers, into push-pull digital integrator circuits, affords a long-term accuracy for the system not previously available in known devices, much less in a system of essentially inexpensive and simple components such as that described above. The pilot is assured of accurate information without continually resetting and re-calibrating the control system, adding materially to the benefits of the system and permitting the pilot to fly by instrument with a minimum of training and a maximum of safety.

The simple and rugged mechanisms employed for the roll sensing devices 101 and the pitch sensing devices 125 are also of substantial importance in connection with the system of the present invention. Each of these devices is, in essence, a simple pendulum corrected for extraneous forces. The preferred forms of sensing apparatus described above make it possible to obtain the essential accuracy in the determination of aircraft attitude without requiring complex and expensive multi-gimbal gyro mechanisms. Furthermore, these devices afford sufficient output torque for direct drive of a display apparatus.

Hence while preferred embodiments of the invention have been described and illustrated, it is to be understood that they are capable of variation and modification.

I claim:
1. An attitude indicator apparatus for an aircraft instrumentation system, comprising:
    a pendulum limited to movement about a single axis;
    means for mounting said pendulum within an aircraft with the pendulum axis parallel to a selected one of the longitudinal and transverse axes of the aircraft so that pivotal movement of the pendulum is representative of the combined effect of
    (1) changes in the direction of gravitational force on the pendulum due to rotation of the aircraft about said selected aircraft axis and
    (2) a specific function of the velocity of the aircraft;
    additional sensing means, essentially independent of changes in the direction of gravitational force, for developing a signal representative of the aforesaid specific function of the velocity of the aircraft; and
    indicator means, coupled to said pendulum and to said additional sensing means, for indicating the instantaneous attitude of the aircraft in relation to rotation of the aircraft about said selected aircraft axis as the vector sum of said signal and of the amplitude of free pivotal torque of said pendulum.

2. Aircraft roll attitude indicator apparatus according to claim 1 in which:
    said selected axis is the longitudinal axis of said aircraft;
    said additional sensing means comprises a gyro having a single degree of freedom, limited to pivotal movement about a single pivotal axis that is normal to the rotational axis of the gyro and parallel to the longitudinal axis of the aircraft; and said indicator means indicates the instantaneous roll attitude of the aircraft as the vector sum of the precession torque of said gyro and the free pivotal torque of said pendulum.

3. Aircraft pitch attitude indicator apparatus according to claim 1 in which:

said selected axis is the transverse axis of the aircraft;

said additional sensing means develops an acceleration signal representative of acceleration of the aircraft parallel to its longitudinal axis; and said indicator means indicates the instantaneous pitch attitude of the aircraft as the vector sum of said acceleration signal and of the amplitude of free pivotal torque of said pendulum.

4. A roll attitude indicator apparatus for aircraft instrumentation comprising:

a pendulum limited to pivotal movement about a single axis;

means for mounting said pendulum within an aircraft with the pendulum axis parallel to the longitudinal axis of the aircraft so that pivotal movement of the pendulum is representative of the combined effect of changes in the direction of gravitational force on the pendulum due to rotation of the aircraft about its longitudinal axis and of angular turning velocity of the aircraft;

a gyro having a single degree of freedom, limited to pivotal movement about a single pivotal axis normal to the rotational axis of the gyro;

means for mounting said gyro within the aircraft with the pivotal axis of the gyro parallel to the longitudinal axis of the aircraft and with the rotational axis of the gyro parallel to the transverse axis of the aircraft so that the precession torque of the gyro is proportional to angular velocity of the aircraft about an axis parallel to the vertical axis of the aircraft;

and indicator means, coupled to said pendulum and to said gyro, for indicating the instantaneous roll attitude of the aircraft as the vector sum of the precession torque of said gyro and the free pivotal torque of said pendulum.

5. A roll attitude indicator apparatus according to claim 4 and further comprising:

pendulum sensing means for developing a first electrical signal proportional to the pivotal torque of said pendulum; and gyro sensing means for developing a second electrical signal proportional to the precession torque of said gyro;

said indicator means comprising means for vectorially comparing said first and second electrical signals.

6. A roll attitude indicator apparatus according to claim 4, in which said pendulum is affixed to a shaft parallel to the longitudinal axis of the aircraft, said gyro is mounted on said shaft and limited to pivotal movement about the axis of said shaft, and said indicator means is coupled to said shaft.

7. A pitch attitude indicator apparatus for aircraft instrumentation comprising:

a pendulum, limited to movement about a single axis;

means for mounting said pendulum within an aircraft so that its axis is parallel to one of the vertical and transverse axes of the aircraft and pivotal movement of the pendulum is representative of the combined effect of changes in the direction of gravitational force on the pendulum due to rotation of the aircraft about its transverse axis and of acceleration of the aircraft parallel to its longitudinal axis;

speed sensing means, essentially independent of changes in the direction of gravitational force, for developing a speed signal representative of the forward speed of the aircraft;

differentiating means, coupled to said speed sensing means, for differentiating said speed signal to develop an acceleration signal representative of acceleration of the aircraft;

an electrically actuated motor device, electrically coupled to said differentiating means and mechanically coupled to said pendulum, for applying a correction torque to said pendulum tending to pivot said pendulum back through an angle representative of the acceleration forces applied to the pendulum;

and indicator means, coupled to said pendulum, for indicating the instantaneous pitch attitude of the aircraft as the vector sum of the acceleration signal and of the amplitude of free pivotal torque of said pendulum.

8. A pitch attitude indicator apparatus according to claim 7 in which:

said pendulum is affixed to a shaft for rotating the shaft, and the pendulum shaft is mounted in the aircraft with the shaft axis parallel to the transverse axis of the aircraft; and said motor device is mechanically coupled to said pendulum shaft, applying a correction torque to said shaft to rotate said shaft through an angle proportional to the acceleration force on said pendulum and in a direction opposed to the direction of pivotal movement of the pendulum caused by acceleration;

said indicator means being actuated by rotation of said shaft.

9. A pitch attitude indicator apparatus according to claim 7, in which said pendulum is affixed to a shaft and the pendulum shaft is mounted in the aircraft parallel to the vertical axis of the aircraft, and further comprising:

a second pendulum mounted in the aircraft in the same manner as the first-recited pendulum;

connecting means interconnecting the two pendulums for conjoint movement; and biasing means biasing the pendulums towards a center position representative of level flight, said pendulums being effectively limited to pivotal movement through an angle of no more than ±45° to minimize the effect of centrifugal force on the pendulums during rapid changes in pitch attitude.

References Cited

UNITED STATES PATENTS

| 1,706,201 | 3/1929 | Drexler | 33—204 |
| 2,579,570 | 12/1951 | Hauptman | 244—79 |
| 2,581,743 | 1/1952 | Zakheim | 244—79 |

DONALD O. WOODIEL, Primary Examiner

U.S. Cl. XR

73—178